United States Patent
Bhatia et al.

(10) Patent No.: US 10,291,582 B2
(45) Date of Patent: May 14, 2019

(54) SYSTEM AND METHOD OF SUPPORTING MORE THAN 256 SENSORS BY INTELLIGENT PLATFORM MANAGEMENT INTERFACE (IPMI) BASED SERVER MANAGEMENT CONTROLLER

(71) Applicant: AMERICAN MEGATRENDS, INC., Norcross, GA (US)

(72) Inventors: Anurag Bhatia, Lilburn, GA (US); Samvinesh Christopher, Suwanee, GA (US); David Wise, Lawrenceville, GA (US); Winston Thangapandian, Duluth, GA (US); Viswanathan Swaminathan, Suwanee, GA (US); Balaji Nagalingam Rajendiran, Duluth, GA (US)

(73) Assignee: AMERICAN MEGATRENDS, INC., Norcross, GA (US)

(*) Notice: Subject to any disclaimer, the term of this patent is extended or adjusted under 35 U.S.C. 154(b) by 665 days.

(21) Appl. No.: 14/592,228

(22) Filed: Jan. 8, 2015

(65) Prior Publication Data

US 2016/0204982 A1    Jul. 14, 2016

(51) Int. Cl.
*H04L 29/12* (2006.01)
*H04L 12/24* (2006.01)
(Continued)

(52) U.S. Cl.
CPC ...... *H04L 61/6095* (2013.01); *H04L 41/0213* (2013.01); *H04L 41/04* (2013.01);
(Continued)

(58) Field of Classification Search
CPC . H04L 61/6095; H04L 41/0213; H04L 41/04; H04L 61/103; H04L 61/2038; H04L 67/125; H04L 69/40
See application file for complete search history.

(56) References Cited

U.S. PATENT DOCUMENTS

| 8,725,923 B1* | 5/2014 | Frangioso | G06F 11/3034 710/306 |
| 2004/0133398 A1* | 7/2004 | Merkin | G06F 11/3006 702/188 |
| 2004/0230866 A1* | 11/2004 | Yates | G06F 11/273 714/25 |

(Continued)

OTHER PUBLICATIONS

Intel, et al. (2013) Intelligent Platform Management Interface Specification Second Generation v.2.0. Retrieved from https://www.intel.com/content/dam/www/public/us/en/documents/product-briefs/ipmi-second-gen-interface-spec-v2-rev1-1.pdf.*

*Primary Examiner* — Krista M Zele
*Assistant Examiner* — Timothy Sowa
(74) *Attorney, Agent, or Firm* — Locke Lord LLP; Tim Tingkang Xia, Esq.

(57) ABSTRACT

A system includes a computing device and a server management controller configured to be connected to the computing device. The server management controller includes a processor, an interface in communication with multiple sensors disposed in the computing device, and a non-volatile memory storing computer executable code. The code, when executed at the processor, is configured to: assign each of the sensors with a logical unit number (LUN) and a sensor number; receive a first message from a first sensor of the sensors via the interface, where the first message has a first LUN field storing the assigned LUN and a first sensor number field storing the assigned sensor number of the first sensor; process the received first message; and determine the first sensor as a source of the first message based on the LUN and the sensor number stored in the first message.

24 Claims, 3 Drawing Sheets

(51) Int. Cl.
   *H04L 29/08*   (2006.01)
   *H04L 29/14*   (2006.01)

(52) U.S. Cl.
   CPC ........ *H04L 61/103* (2013.01); *H04L 61/2038* (2013.01); *H04L 67/125* (2013.01); *H04L 69/40* (2013.01)

(56) References Cited

U.S. PATENT DOCUMENTS

| | | | | |
|---|---|---|---|---|
| 2004/0249913 A1* | 12/2004 | Kaufman, Jr. | ...... | G06F 11/3006 709/223 |
| 2004/0260841 A1* | 12/2004 | Mathew | ............. | H04L 41/0206 709/250 |
| 2005/0267956 A1* | 12/2005 | Huang | ................. | H04L 41/069 709/223 |
| 2006/0101372 A1* | 5/2006 | Zhuo | .................... | G06F 11/3604 717/100 |
| 2006/0168189 A1* | 7/2006 | Huang | ................. | H04L 67/125 709/223 |
| 2006/0206286 A1* | 9/2006 | Mugunda | .............. | G06F 13/102 702/182 |
| 2007/0168049 A1* | 7/2007 | Rao | ..................... | G06F 11/3031 700/11 |
| 2009/0089624 A1* | 4/2009 | Austen | ................ | G06F 11/0727 714/39 |
| 2012/0254423 A1* | 10/2012 | Mescher | ............. | G06F 11/3006 709/224 |
| 2013/0117766 A1* | 5/2013 | Bax | ....................... | G06F 9/4405 719/323 |
| 2014/0013388 A1* | 1/2014 | Chandrasekhar | ....... | G06F 21/70 726/3 |
| 2014/0143563 A1* | 5/2014 | Wakayoshi | ......... | H04L 41/0833 713/310 |

* cited by examiner

SYSTEM AND METHOD OF SUPPORTING MORE THAN 256 SENSORS BY INTELLIGENT PLATFORM MANAGEMENT INTERFACE (IPMI) BASED SERVER MANAGEMENT CONTROLLER

FIELD

The present disclosure relates generally to Intelligent Platform Management Interface (IPMI) based server management controller, and particularly to a system and method of supporting more than 256 sensors by IPMI based server management controller using logical unit number (LUN).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, a server management controller refers to a specialized microcontroller that manages the interface between system management software and platform hardware. The server management controller can be embedded on the motherboard of a computer, generally a server. For example, different types of sensors can be built into the computer system, and the server management controller reads these sensors to obtain parameters such as temperature, cooling fan speeds, power status, operating system (OS) status, etc. The server management controller monitors the sensors and can send alerts to a system administrator via the network if any of the parameters do not stay within preset limits, indicating a potential failure of the system. The administrator can also remotely communicate with the server management controller to take some corrective action such as resetting or power cycling the system to get a hung OS running again.

In a standard rack server system, a server management controller can be used for managing and monitoring the server system, and the server management controller that runs IPMI stack can monitor up to 256 sensors as per IPMI standards. However, the number of sensors that need to be monitored by the server management controller increases day by day. In some server systems, may be more than 256 sensors. There is a greater practical need to monitor sensors more than 256 in some of the modern platform designs.

Therefore, an unaddressed need exists in the art to address the aforementioned deficiencies and inadequacies.

SUMMARY

In one aspect, the present disclosure is related to a system. In one embodiment, the system includes a computing device and a server management controller configured to be connected to the computing device. The server management controller has a processor, an interface in communication with a plurality of sensors disposed in the computing device and a non-volatile memory storing computer executable code. The code, when executed at the processor, is configured to:

assign each of the sensors with a logical unit number (LUN) and a sensor number;

receive a first message from a first sensor of the sensors via the interface, wherein the first message comprises a first LUN field storing the assigned LUN and a first sensor number field storing the assigned sensor number of the first sensor;

process the received first message; and determine the first sensor as a source of the first message based on the LUN and the sensor number stored in the first message.

In certain embodiments, the code, when executed at the processor, is further configured to:

based on the processing of the received first message, determine a second sensor of the sensors as a destination;

generate a second message configured to be sent to the destination, wherein the second message comprises a second LUN field storing the assigned LUN and a second sensor number field storing the assigned sensor number of the second sensor; and send the second message to the second sensor as the destination based on the LUN and the sensor number stored in the second message.

In certain embodiments, the first sensor and the second sensor are the same sensor.

In certain embodiments the code includes a sensor configuration module configured to assign each of the sensors with a LUN and a sensor number, and a message handler module configured to receive the first message from the first sensor via the interface, process the received first message, generate the second message, and send the second message to the second sensor. The message handler module includes a sensor identification module configured to determine the first sensor as the source of the first message based on the LUN and the sensor number stored in the first message, and to determine the second sensor as the destination based on the processing of the received first message.

In certain embodiments, each of the first message and the second message is an intelligent platform management interface (IPMI) message.

In certain embodiments, each of the first LUN field and the second LUN field is a 2 bits field, and each of the first sensor number field and the second sensor number field is a one byte field.

In certain embodiments, the assigned LUN is 0, 1, 2 or 3 and the assigned sensor number is an integer selected from 0-255.

In certain embodiments, the first message further includes a first network function (NetFn) field identifying the first message as a request message or a response message. In certain embodiments, the second message further includes a second NetFn field identifying the second message as the request message or the response message. In certain embodiments, when the first message is identified as the request message, the second message is identified as the response message in response to the first message.

In another aspect, the present disclosure relates to a method for server management control in a system. The system includes a computing device and a server management controller configured to be connected to the computing device. In certain embodiments, the method includes:

assigning, by the server management controller, each of a plurality of sensors disposed in the computing device with a logical unit number (LUN) and a sensor number, wherein the server management controller comprises an interface in communication with the sensors;

receiving, at the server management controller, a first message from a first sensor of the sensors via the interface, wherein the first message comprises a first LUN field storing the assigned LUN and a first sensor number field storing the assigned sensor number of the first sensor;

processing, by the server management controller, the received first message; and determining, by the server management controller, the first sensor as a source of the first message based on the LUN and the sensor number stored in the first message.

In certain embodiments, the method further includes:

determining, by the server management controller, a second sensor as a destination based on the processing of the received first message;

generating, by the server management controller, a second message configured to be sent to the destination, wherein the second message comprises a second LUN field storing the assigned LUN and a second sensor number field storing the assigned sensor number of the second sensor; and sending, by the server management controller, the second message to the second sensor as the destination based on the LUN and the sensor number stored in the second message.

In certain embodiments, the first sensor and the second sensor are the same sensor.

In certain embodiments, each of the first message and the second message is an intelligent platform management interface (IPMI) message.

In certain embodiments, each of the first LUN field and the second LUN filed is a 2 bits field and each of the first sensor number field and the second sensor number field is a one byte field, the assigned LUN is 0, 1, 2 or 3, and the assigned sensor number is an integer selected from 0-255.

In certain embodiments, the first message further includes a first NetFn field identifying the first message as a request message or a response message. In certain embodiments, the second message further includes a second NetFn field identifying the second message as the request message or the response message. In certain embodiments, when the first message is identified as the request message, the second message is identified as the response message in response to the first message.

In a further aspect, the present disclosure relates to a non-transitory computer readable medium storing computer executable code. In certain embodiments, the code, when executed at a processor of a server management controller of a system, is configured to:

assign each of a plurality of sensors disposed in a computing device of the system with a logical unit number (LUN) and a sensor number, wherein the server management controller is configured to be connected to the computing device, and the server management controller further comprises an interface in communication with the plurality of sensors;

receive a first message from the first sensor of the sensors via the interface, wherein the first message comprises a first LUN field storing the assigned LUN and a first sensor number field storing the sensor number of the first sensor;

process the received first message; and determine the first sensor as a source of the first message based on the LUN and the sensor number stored in the first message.

In certain embodiments, the code, when executed at the processor of the server management controller, is further configured to:

determine a second sensor as a destination based on the processing of the received first message;

generate a second message configured to be sent to the destination, wherein the second message comprises a second LUN field storing the assigned LUN and a second sensor number field storing the assigned sensor number of the second sensor; and send the second message to the second sensor as the destination based on the LUN and the sensor number stored in the second message.

In certain embodiments, the first sensor and the second sensor are the same sensor.

In certain embodiments, the code includes a sensor configuration module configured to assign each of the sensors with a LUN and a sensor number, and a message handler module configured to receive the first message from the first sensor via the interface, process the received first message, generate the second message, and send the second message to the second sensor. The message handler module includes a sensor identification module configured to determine the first sensor as the source of the received first message based on the LUN and the sensor number stored in the first message, and to determine the second sensor as the destination based on the processing of the received first message.

In certain embodiments, each of the first message and the second message is an intelligent platform management interface (IPMI) message.

In certain embodiments, each of the first LUN field and the second LUN filed is a 2 bits field and each of the first sensor number field and the second sensor number field is a one byte field, the assigned LUN is 0, 1, 2 or 3, and the assigned sensor number is an integer selected from 0-255.

In certain embodiments, the first message further includes a first NetFn field identifying the first message as a request message or a response message. In certain embodiments, the second message further includes a second NetFn field identifying the second message as the request message or the response message. In certain embodiments, when the first message is identified as the request message, the second message is identified as the response message in response to the first message.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
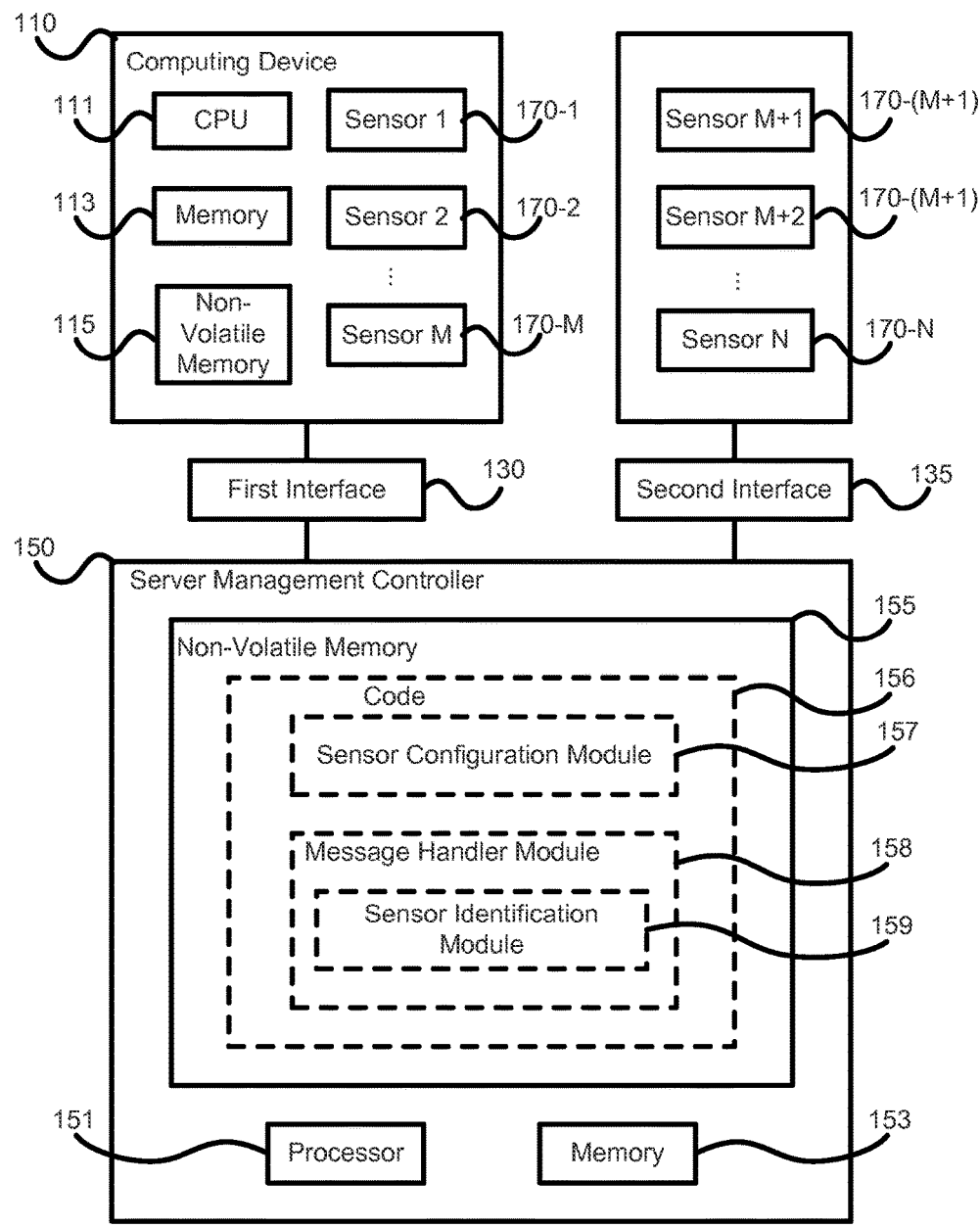
FIG. 1 schematically depicts a system having a computing device and a server management controller according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure generally relates to IPMI message transmission, and particularly to a system and method of forwarding IPMI message packets based on the LUN. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

As per IPMI Specification of version 1.5 and newer version, the Send Message command has to be used to perform extended bridging of IPMI messages to the SP or BMC. With the Send Message command definition, there is an overhead to wait for a period of time to receive a response from the bridged message. The application that sends the request also has to decipher whether the returned response is a response to the Send message command or a response to the encapsulated IPMI message.

FIG. 1 schematically depicts a system having a computing device and a server management controller according to certain embodiments of the present disclosure. As shown in FIG. 1, the system 100 includes a computing device 110, a server management controller 150, and a plurality of sensors 170-1 to 170-N disposed in the computing device 110, where N is a positive integer. Each of the sensors 170-1 to 170-N communicates with the server management controller 150 via the first interface 130 or the second interface 135.

The computing device 110 is a host computer for the server management controller 120, which functions as a server in the system 100. In certain embodiments, the computing device 110 may be a general purpose server or a headless server. Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

As shown in FIG. 1, the computing device 110 may include, but not limited to, a central processing unit (CPU) 111, a memory 113, a non-volatile memory 115 and other required memory and I/O modules (not shown). In certain embodiments, the CPU 111, the memory 113, and the non-volatile memory 115 may be embedded on the baseboard, or may be connected to the baseboard through at least one interface.

The CPU 111 is a processor which is configured to control operation of the computing device 110, and to execute the software applications for the computing device 110. In certain embodiments, the computing device 110 may run on or more than one CPU as the host processor, such as two CPUs, four CPUs, eight CPUs, or any suitable number of CPUs.

The memory 113 may be a volatile memory, such as the random-access memory (RAM), for storing the data and information during the operation of the computing device 110. In certain embodiments, the memory 113 is in communication with the CPU 111 through a system bus (not shown).

The non-volatile memory 115 is a non-volatile data storage media for storing an operating system (OS) (not shown) and other applications of the computing device 110. In certain embodiments, the non-volatile memory 115 may be a magnetic hard disk or an optical disk. The non-volatile memory 115 may store the OS and any other necessary software or firmware components executable at the CPU 111. In certain embodiments, the OS and any other necessary software or firmware components may be implemented as computer executable codes.

The server management controller 150 is connected to the computing device 110 via the first interface 130. The first interface 130 may be a system interface. In certain embodiments, the first interface 130 may be a typical standardized IPMI system interface, such as the intelligent platform management interface (IPMB) interface, the keyboard controller style (KCS) interface, the server management interface chip (SMIC) interface, the block transfer (BT) interface, or the SMBus system interface (SSIF). In certain embodiments, the first system interface 130 may be a universal serial bus (USB) interface. In certain embodiments, the server management controller 150 may be connected to the computing device 110 via more than one interface. For example, the server management controller 150 may be connected to the computing device 110 via a KCS interface and a USB interface. In certain embodiments, data transmission between the computing device 110 and the server management controller 150 may be in the format of IPMI messages, which go through the system interface 130.

In certain embodiments, the server management controller 150 may be a service processor (SP) or a baseboard management controller (BMC). Different types of sensors 170-1 to 170-M may be built into the computing device 110, where M is a positive integer smaller than or equal to N. The server management controller 150 reads these sensors 170-1 to 170-M to obtain parameters such as temperature, cooling fan speeds, power status, OS status, etc.

As shown in FIG. 1, the server management controller 150 includes a processor 151, a memory 153, and a non-volatile memory 155. In certain embodiments, the server management controller 150 may include other components, such as at least one I/O device (not shown).

The processor 151 controls operation of the server management controller 150. In certain embodiments, the processor 151 may be a CPU. The processor 151 may execute the firmware or other codes stored in the non-volatile memory 155 of the server management controller 150. In certain embodiments, the server management controller 150 may run on or more than one processor.

The memory 153 can be a volatile memory, such as the RAM, for storing the data and information during the operation of the server management controller 150.

The non-volatile memory 155 is a non-volatile data storage media, which stores the computer executable code 156 for performing the operation of the server management controller 150. The code 156 of the server management controller 150 may be implemented as firmware. As shown in FIG. 1, the code 156 of the server management controller 150 includes, among other things, a sensor configuration module 157 and a message handler module 158. The message handler module 158 may include a sensor identification module 159. In certain embodiments, the code 156 may include other necessary modules to perform operations of the server management controller 150. In certain embodiments, the code may be a program for generating and processing IPMI messages for the server management controller 150.

As shown in FIG. 1, the system 100 includes multiple sensors 170-1 to 170-N disposed on the computing device 110. In certain embodiments, the sensors 170-1 to 170-M are built in the computing device 110, where M is a positive integer, and M≤N. The first interface 130 is configured to perform communication for the server management controller 150 with the sensors 170-1 to 170-M, and the second interface 135 is configured to perform communication for the server management controller 150 with the sensors 170-(M+1) to 170-N. In certain embodiments, the second interface 135 may be the same type of or a different type of interface comparing with the first interface 130. It should be understood that one or more first interfaces 130 and one or more second interfaces 135 may be used for the communication between the sensors 170-1 to 170-N and the server management controller 150.

In certain embodiments, a message is used for the communication between the sensors 170-1 to 170-N and the server management controller 150. In certain embodiments, the message may be an IPMI message, which can be a request message (generally labeled as "rq") or a response message (generally labeled as "rs"). An IPMI message normally includes a header, an IPMI command section, and a footer. For an IPMI message between one of the sensors 170-1 to 170-N and the server management controller 150, the IPMI command section may include data of the corresponding sensor.

Figure 2:
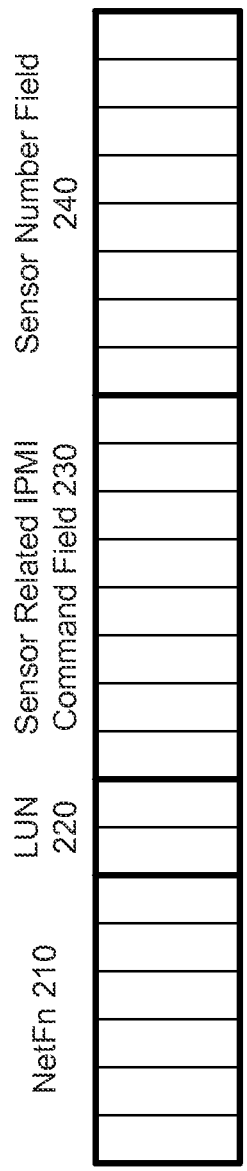
FIG. 2 schematically depicts an IPMI message according to certain embodiments of the present disclosure.

FIG. 2 schematically depicts an IPMI message according to certain embodiments of the present disclosure. As shown in FIG. 2, the IPMI message 200 has a plurality of fields, which are shown in bolded blocks, and each field may include one or more bits, which are shown in smaller blocks. The fields of the IPMI message 200 includes a network function (NetFn) field 210, a LUN field 220, a sensor related IPMI command field 230, and a sensor number field 240. In certain embodiments, the IPMI message 200 may include other fields not shown in FIG. 2.

The NetFn field 210 is a six-bit field that describes the network function of the IPMI message. In certain embodiments, the NetFn field 210 is a part of the header of the IPMI message 200. The IPMI Specification defines certain predefined categories for the NetFn field 210, and there are reserved codes for OEM expansion. For a request message, the NetFn field 210 is an odd number, and for a response message, the NetFn field 210 is an even number. In other words, the NetFn field 210 may be used to identify the IPMI message as a request message or a response message.

The LUN field 220 is a two-digit logical unit number for subaddressing purposes. In certain embodiments, the LUN field 220 is a part of the header of the IPMI message 200. In other words, the value of the LUN field 220 can be 0 (00 in a binary format), 1 (01 in the binary format), 2 (10 in the binary format), or 3 (11 in the binary format). Generally, the default value of the LUN field 220 is 0 (00 in the binary format).

The sensor related IPMI command field 230 is one-byte field storing the IPMI command. In certain embodiments, when the IPMI message 220 is used for communication between one of the sensors 170 and the server management controller 150, the data stored in the sensor related IPMI command field 230 is a sensor related IPMI command. In certain embodiments, the sensor related IPMI command relates to the status of the corresponding sensor.

The sensor number field 240 is a one-byte field for identifying a specific sensor. In other words, the value of the sensor number field 240 can be an integer selected from 0 (00000000 in the binary format) to 255 (11111111 in the binary format). Typically, the sensor number field 240 may be the only field used for identifying the sensors. In other words, normally 256 sensors may be identified by the sensor number field 240 in a system.

The sensor configuration module 157 of the code 156 is configured to assign a LUN and a sensor number to each of the sensors 170-1 to 170-N, and is configure to take the advantage of expanding the identification of more than 256 sensors using the combination of the LUN and the sensor number stored in the LUN field and the sensor number field of an IPMI message. For example, a message, such as an IPMI message, may include a LUN field for storing the assigned LUN and a sensor number field for storing the assigned sensor number of a sensor. As described above, the LUN field is a 2 bits field and the sensor number field is a one-byte field. The LUN may be one of the four possible values of 0, 1, 2 or 3, and the sensor number may be one of the 256 possible integer values of 0-255. When each of the sensors 1, 2 . . . M, M+1, M+2 . . . N is assigned with a specific combination of a LUN and sensor number, the possible combinations will be 4×256=1024. In other words, 1024 sensors can be each assigned with a specific LUN and sensor number combination. For example, a sensor 1, may have an assigned LUN of 0 and an assigned sensor number of 1, and a sensor M, may have an assigned LUN of 1 and an assigned sensor number of 1. Though the sensor 1 and the sensor M have the same sensor number 1, they have different LUN number 0 and 1 respectively. Accordingly, the sensor 1 and the sensor M can be identified as different sensors based on their assigned LUNs and sensor numbers.

The message handler module 158 is configured to receive a first message from the first sensor of the sensors 170-1 to 170-N via the first interface 130 or the second interface 135. Upon receiving the first message, the message handler module is further configured to process the data included in the first message, generate a second message, and send the second message to a second sensor. In certain embodiments, the first sensor and the second sensor may be the same sensor. In certain embodiments, each of the first message and the second message may be an IPMI message as shown in FIG. 2, which respectively includes a NetFn field 210, a LUN field 220, a sensor related IPMI command field 230, and a sensor number field 240. For each of the first message and the second message, the NetFn field 210 of the message may be used to identify the message as a request message or a response message. In certain embodiments, when the first message is identified by its NetFn field 210 as the request message, the second message may be a response message in response to the first message. In this case, the second message may be identified by its NetFn field 210 as the response message.

As shown in FIG. 1, the message handler module 158 includes a sensor identification module 159. The sensor identification module 159, during the operation of the message handler module 158, is configured to determine the first sensor as a source of the first message based on the LUN and the sensor number stored in the first message. Further, the sensor identification module 159, based on the processing of the received first message, is configured to determine the second sensor as a destination. Thus, when the message handler module 158 generates the second message, the second message includes a LUN field and a sensor number field storing the assigned LUN and the assigned sensor number of the second sensor. In other words, the sensor configuration module 157 assigns the LUN and the sensor number to the second sensor, the sensor identification module 159 determines the second sensor as the destination, and when the message handler module 158 generates the second message, the LUN and the sensor number assigned to the second sensor is stored in the LUN field and the sensor number field of the generated second message.

Figure 3:
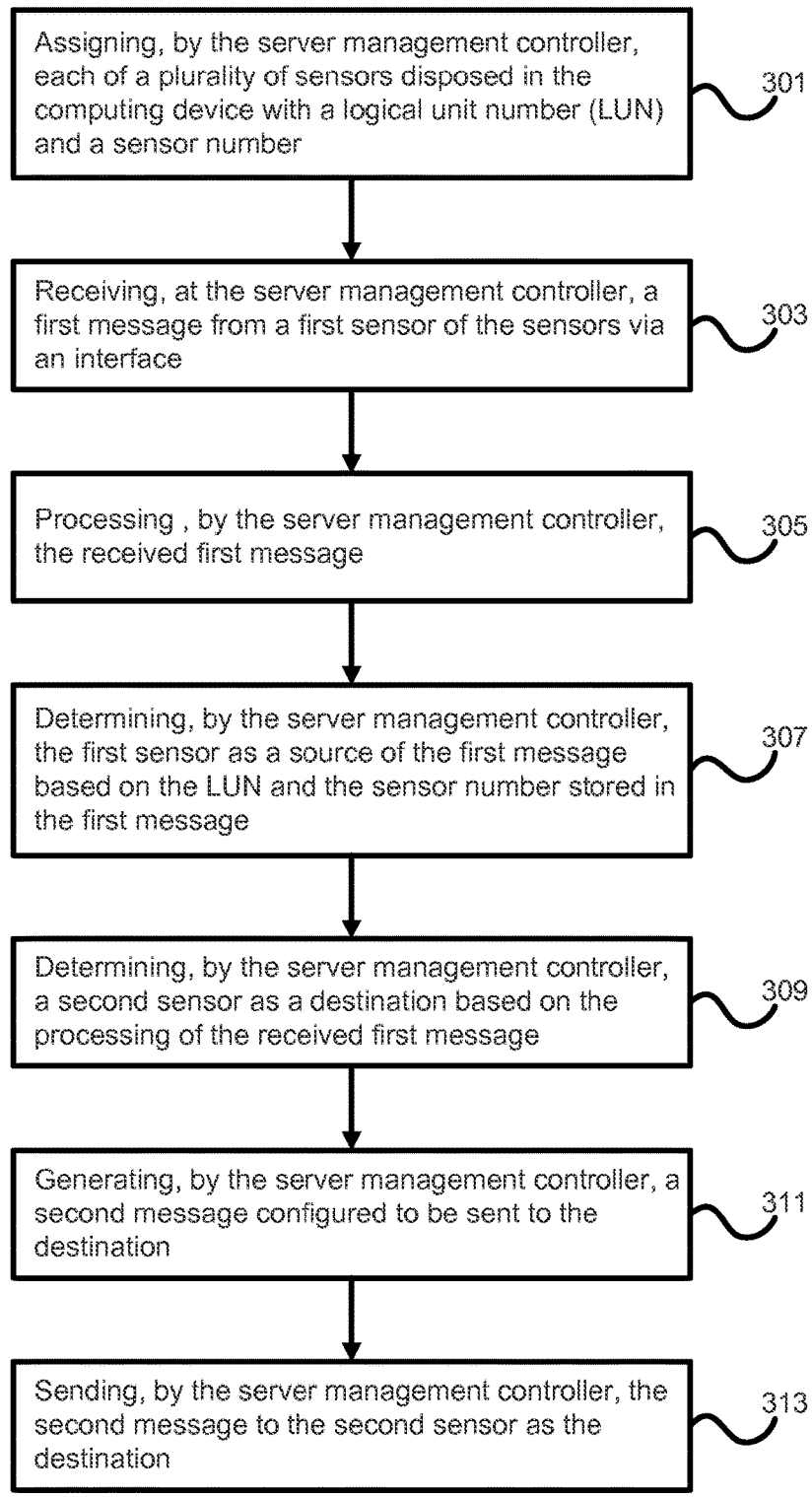
FIG. 3 depicts a flowchart showing operation of a server management controller of a system according to certain embodiments of the present disclosure.

FIG. 3 depicts a flowchart showing operation of a server management controller of a system according to certain embodiments of the present disclosure. In certain embodiments, the method 300 as described in FIG. 3 may be implemented by the system 100 as shown in FIG. 1.

Referring to FIG. 3, when the server management controller is initialized, at operation 301, the sensor configuration module 157 assign each of the sensors 170-1 to 170-N disposed in the computing device 110 with a LUN and a sensor number. As described above, the LUN may be 0, 1, 2 or 3, and the sensor number may be 0-255. Different sensors may have the same sensor number as long as their LUNs are different. Generally, the sensors 170-1 to 170-N will be assigned numbers in a sequence. For example, when the number N is smaller than 256, all of the sensors 170 may be assigned with 0 as the LUN, and the sensor numbers starting from 0 to N−1. In certain embodiments, when the number N is greater than 256, the first set of 256 sensors 170-1 to 170-256 may be assigned with 0 as the LUN, and the sensor numbers starting from 0 to 255. Any additional set of sensors may be assigned with 1, 2 or 3 as the LUN. For example, the second set of 256 sensors 170-257 to 170-512 may be assigned with 1 as the LUN, and the sensor numbers starting from 0 to 255. In this case, the first sensor 170-1 in the first set and the first sensor 170-257 in the second set may have the same sensor number as 0, but may be distinguishable by the different LUN.

In certain embodiments, the identification of each sensor with both a LUN and a sensor number is adopted by all the related hardware and software in the system 100. For example, sensor data record (SDR) and sensor monitoring code used or stored in the system 100 may identify a specific sensor by both the LUN and the sensor number of that sensor.

At operation 303, when a first message is sent from the first sensor of the sensors 170-1 to 170-N to the server management controller 150 via the first interface 130 or the second interface 135, the message handler module 158 receives the first message. The first message includes a LUN field storing the assigned LUN of the first sensor, and a sensor number field storing the assigned sensor number of the first sensor. In certain embodiments, the first message may be an IPMI message, which includes a NetFn field 210, a LUN field 220, a sensor related IPMI command field 230, and a sensor number field 240 as shown in FIG. 2. The NetFn field of the first message may be used to identify the first message as a request message or a response message. The sensor related IPMI command field may store a first sensor related IPMI command, which may correspond to status of the first sensor.

Upon receiving the first message, at operation 305, the message handler module 158 processes the received first message. During the processing, at operation 307, the sensor identification module 159 determines the first sensor as a source of the first message based on the LUN and the sensor number stored in the first message. In other words, since each of the sensors has a specific combination of a LUN and a sensor number, the first sensor can be determined unambiguously through the LUN and the sensor number stored in the LUN field and the sensor field in the first message.

It should be particularly noted that the operations 305 and 307, although listed in sequence as shown in FIG. 3, may be performed in a different order. In certain embodiments, the operation 307 may be performed during the operation 305. In certain embodiments, the operations 305 and 307 may be performed at the same time. In certain embodiments, the operation 305 may be performed before or after the operation 307.

Further, during the processing of the received first message, at operation 309, the sensor identification module 159 determines a second sensor as a destination. In certain embodiments, the sensor identification module 159 identifies the second sensor by the LUN and the sensor number previously assigned to the second sensor by the sensor configuration module 157. In certain embodiments, based on the sensor related command or other data stored in the first message, the second sensor may or may not be the first sensor.

At operation 311, the message handler module 158 generates a second message configured to be sent to the destination, i.e., the second sensor. The second message includes a LUN field storing the assigned LUN of the second sensor, and a sensor number field storing the assigned sensor number of the second sensor. In certain embodiments, the second message may be an IPMI message, which includes a NetFn field 210, a LUN field 220, a sensor related IPMI command field 230, and a sensor number field 240 as shown in FIG. 2. The NetFn field of the second message may be used to identify the second message as a request message or a response message. In certain embodiments, when the first message is identified by its NetFn field as the request message, the second message may be a response message in response to the first message. In this case, the second message may be identified by its NetFn field as the response message. The sensor related IPMI command field of the second message may store a second sensor related IPMI command, which may correspond to status of the second sensor or may be configured to monitor or change status of the second sensor.

After the second message is generated, at operation 313, the message handler module 158 sends the second message to the second sensor via the first interface 130 or the second interface 135. Since the LUN and the sensor number stored in the second message are unambiguously assigned to the second sensor, the second message can be delivered to the second sensor without confusing the second sensor with any other sensors. Even if another sensor may have the same sensor number as the second sensor, the another sensor would have a LUN different from the LUN of the second sensor.

In a further aspect, the present disclosure is related to a non-transitory computer readable medium storing computer executable code. The code, when executed at one or more processor of a server management controller 150, may perform the method as described above. In certain embodiments, the non-transitory computer readable medium may include, but not limited to, the non-transitory memory 153 as described above, or any other storage media of the server management controller 150.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a computing device; and
   a server management controller configured to be connected to the computing device, the server management controller comprising:

a processor;
an interface in communication with a plurality of physical sensors disposed in the computing device; and
a non-volatile memory storing computer executable code, wherein the code, when executed at the processor, is configured to:
assign each of the physical sensors with a specific combination of a logical unit number (LUN) and a sensor number, so that the each of the physical sensors is identifiable based on the specific combination of the LUN and the sensor number being assigned therewith, wherein the LUN is one selected from the group consisting of 0, 1, 2 and 3 and the sensor number is one selected from 0 to 255; the specific combination of the LUN and the sensor number identifies the each of the physical sensors, and the number of combinations is more than 256 and up to 1024; and the number of the physical sensors that are supported and monitored by the server management controller using the LUN is more than 256 and up to 1024;
receive a first message from a first sensor of the physical sensors via the interface, wherein the first message comprises a first LUN field storing the assigned LUN and a first sensor number field storing the assigned sensor number of the first sensor;
process the received first message; and
determine the first sensor as a source of the first message based on the LUN and the sensor number stored in the first message,
wherein at least two of the physical sensors are assigned with an identical sensor number, and each of the at least two of the physical sensors being assigned with the identical sensor number is assigned with a different LUN,
wherein the plurality of physical sensors comprises a first set of physical sensors and a second set of physical sensors, and one of the first set of physical sensors communicates with one of the second set of physical sensors through the first interface, the server management controller and a second interface sequentially; and
wherein the first interface and the second interface are two separate components.

2. The system of claim 1, wherein the code, when executed at the processor, is further configured to:
based on the processing of the received first message, determine a second sensor of the physical sensors as a destination;
generate a second message configured to be sent to the destination, wherein the second message comprises a second LUN field storing the assigned LUN and a second sensor number field storing the assigned sensor number of the second sensor; and
send the second message to the second sensor as the destination based on the LUN and the sensor number stored in the second message.

3. The system of claim 2, wherein the code comprises:
a sensor configuration module configured to assign each of the physical sensors with a LUN and a sensor number; and
a message handler module configured to receive the first message from the first sensor via the interface, process the received first message, generate the second message, and send the second message to the second sensor,
wherein the message handler module comprises a sensor identification module configured to determine the first sensor as the source of the first message based on the LUN and the sensor number stored in the first message, and to determine the second sensor as the destination based on the processing of the received first message.

4. The system of claim 2, wherein the first sensor and the second sensor are the same sensor.

5. The system of claim 2, wherein each of the first message and the second message is an intelligent platform management interface (IPMI) message.

6. The system of claim 5, wherein each of the first LUN field and the second LUN field is a 2 bits field, and each of the first sensor number field and the second sensor number field is a one-byte field.

7. The system of claim 5, wherein the first message further comprises a first network function (NetFn) field identifying the first message as a request message or a response message.

8. The system of claim 7, wherein the second message further comprises a second NetFn field identifying the second message as the request message or the response message.

9. The system of claim 8, wherein when the first message is identified as the request message, the second message is identified as the response message in response to the first message.

10. A method for server management control in a system having a computing device and a server management controller configured to be connected to the computing device, the method comprising:
assigning, by the server management controller, each of a plurality of physical sensors disposed in the computing device with a specific combination of a logical unit number (LUN) and a sensor number, so that each of the physical sensors is identifiable based on the specific combination of the LUN and the sensor number being assigned therewith, wherein the server management controller comprises an interface in communication with the physical sensors, wherein the LUN is one selected from the group consisting of 0, 1, 2 and 3 and the sensor number is one selected from 0 to 255; the specific combination of the LUN and the sensor number identifies the each of the physical sensors, and the number of combinations is more than 256 and up to 1024; and the number of the physical sensors that are supported and monitored by the server management controller using the LUN is more than 256 and up to 1024;
receiving, at the server management controller, a first message from a first sensor of the physical sensors via the interface, wherein the first message comprises a first LUN field storing the assigned LUN and a first sensor number field storing the assigned sensor number of the first sensor;
processing, by the server management controller, the received first message; and
determining, by the server management controller, the first sensor as a source of the first message based on the LUN and the sensor number stored in the first message,
wherein at least two of the physical sensors are assigned with an identical sensor number, and each of the at least two of the physical sensors being assigned with the identical sensor number is assigned with a different LUN;
wherein the plurality of physical sensors comprises a first set of physical sensors and a second set of physical sensors, and one of the first set of physical sensors communicates with one of the second set of physical sensors through the first interface, the server management controller and a second interface sequentially; and
wherein the first interface and the second interface are two separate components.

11. The method of claim 10, further comprising:
determining, by the server management controller, a second sensor as a destination based on the processing of the received first message;
generating, by the server management controller, a second message configured to be sent to the destination, wherein the second message comprises a second LUN field storing the assigned LUN and a second sensor number field storing the assigned sensor number of the second sensor; and
sending, by the server management controller, the second message to the second sensor as the destination based on the LUN and the sensor number stored in the second message.

12. The method of claim 11, wherein the first sensor and the second sensor are the same sensor.

13. The method of claim 11, wherein each of the first message and the second message is an intelligent platform management interface (IPMI) message.

14. The method of claim 13, wherein each of the first LUN field and the second LUN filed is a 2 bits field and each of the first sensor number field and the second sensor number field is a one-byte field.

15. The method of claim 13, wherein the first message further comprises a first network function (NetFn) field identifying the first message as a request message or a response message, and the second message further comprises a second NetFn field identifying the second message as the request message or the response message.

16. The system of claim 15, wherein when the first message is identified as the request message, the second message is identified as the response message in response to the first message.

17. A non-transitory computer readable medium storing computer executable code, wherein the code, when executed at a processor of a server management controller of a system, is configured to:
assign each of a plurality of physical sensors disposed in a computing device of the system with a specific combination of a logical unit number (LUN) and a sensor number, so that each of the physical sensors is identifiable based on the specific combination of the LUN and the sensor number being assigned therewith, wherein the server management controller is configured to be connected to the computing device, and the server management controller further comprises an interface in communication with the plurality of physical sensors, wherein the LUN is one selected from the group consisting of 0, 1, 2 and 3 and the sensor number is one selected from 0 to 255; the specific combination of the LUN and the sensor number identifies the each of the physical sensors; the number of combinations is more than 256 and up to 1024; and the number of the physical sensors that are supported and monitored by the server management controller using the LUN is more than 256 and up to 1024;
receive a first message from the first sensor of the physical sensors via the interface, wherein the first message comprises a first LUN field storing the assigned LUN and a first sensor number field storing the sensor number of the first sensor;
process the received first message; and
determine the first sensor as a source of the first message based on the LUN and the sensor number stored in the first message,
wherein at least two of the physical sensors are assigned with an identical sensor number, and each of the at least two of the physical sensors being assigned with the identical sensor number is assigned with a different LUN;
wherein the plurality of physical sensors comprises a first set of physical sensors and a second set of physical sensors, and one of the first set of physical sensors communicates with one of the second set of physical sensors through the first interface, the server management controller and a second interface sequentially; and
wherein the first interface and the second interface are two separate components.

18. The non-transitory computer readable medium of claim 17, wherein the code, when executed at the processor of the server management controller, is further configured to:
determine a second sensor as a destination based on the processing of the received first message;
generate a second message configured to be sent to the destination, wherein the second message comprises a second LUN field storing the assigned LUN and a second sensor number field storing the assigned sensor number of the second sensor; and
send the second message to the second sensor as the destination based on the LUN and the sensor number stored in the second message.

19. The non-transitory computer readable medium of claim 18, wherein the code comprises:
a sensor configuration module configured to assign each of the physical sensors with a LUN and a sensor number; and
a message handler module configured to receive the first message from the first sensor via the interface, process the received first message, generate the second message, and send the second message to the second sensor,
wherein the message handler module comprises a sensor identification module configured to determine the first sensor as the source of the received first message based on the LUN and the sensor number stored in the first message, and to determine the second sensor as the destination based on the processing of the received first message.

20. The non-transitory computer readable medium of claim 18, wherein the first sensor and the second sensor are the same sensor.

21. The non-transitory computer readable medium of claim 18, wherein each of the first message and the second message is an intelligent platform management interface (IPMI) message.

22. The non-transitory computer readable medium of claim 21, wherein each of the first LUN field and the second LUN filed is a 2 bits field and each of the first sensor number field and the second sensor number field is a one-byte field.

23. The non-transitory computer readable medium of claim 21, wherein the first message further comprises a first network function (NetFn) field identifying the first message as a request message or a response message, and the second message further comprises a second NetFn field identifying the second message as the request message or the response message.

24. The non-transitory computer readable medium of claim 23, wherein when the first message is identified as the request message, the second message is identified as the response message in response to the first message.

\* \* \* \* \*